(12) United States Patent
Niwa

(10) Patent No.: US 11,638,405 B2
(45) Date of Patent: May 2, 2023

(54) VEGETABLE PRODUCTION METHOD

(71) Applicant: KYOCERA Corporation, Kyoto (JP)

(72) Inventor: Koji Niwa, Hirakata (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/786,608

(22) PCT Filed: Dec. 18, 2020

(86) PCT No.: PCT/JP2020/047457
§ 371 (c)(1),
(2) Date: Jun. 17, 2022

(87) PCT Pub. No.: WO2021/125328
PCT Pub. Date: Jun. 24, 2021

(65) Prior Publication Data
US 2023/0011073 A1 Jan. 12, 2023

(30) Foreign Application Priority Data

Dec. 20, 2019 (JP) ............................. JP2019-230015

(51) Int. Cl.
*A01G 7/04* (2006.01)
*A01G 31/00* (2018.01)
*A01G 7/00* (2006.01)
*A01G 22/15* (2018.01)

(52) U.S. Cl.
CPC ............... *A01G 31/00* (2013.01); *A01G 7/00* (2013.01); *A01G 22/15* (2018.02)

(58) Field of Classification Search
CPC .................................. A01G 7/00; A01G 7/045
See application file for complete search history.

(56) References Cited

U.S. PATENT DOCUMENTS

| | | | |
|---|---|---|---|
| 8,847,514 B1* | 9/2014 | Reynoso | H05B 45/46 315/363 |
| 11,483,981 B1* | 11/2022 | Lo | A01G 31/06 |
| 2016/0007543 A1 | 1/2016 | Takashima et al. | |
| 2016/0198639 A1* | 7/2016 | Millar | H05B 45/20 315/307 |

(Continued)

FOREIGN PATENT DOCUMENTS

| | | |
|---|---|---|
| CN | 105188347 A | 12/2015 |
| JP | 06-007047 A | 1/1994 |

(Continued)

*Primary Examiner* — Kristen C Hayes
(74) *Attorney, Agent, or Firm* — Volpe Koenig

(57) ABSTRACT

A vegetable production method includes seeding, causing a cotyledon to sprout from a seed in a first period, growing a vegetable in a second period subsequent to the first period, further growing the vegetable in a third period subsequent to the second period, and harvesting the vegetable. The vegetable is grown with first light having a first maximum value of a light intensity in a wavelength range of 420 to 490 nm and including at least portion of light in a wavelength range of 500 to 600 nm in a later part of the second period, and is grown with second light having a second maximum value of a light intensity in a wavelength range of 590 to 650 nm, having a peak light intensity less than the second maximum value in a visible light wavelength range of less than or equal to 500 nm.

8 Claims, 12 Drawing Sheets

(56) References Cited

U.S. PATENT DOCUMENTS

| | | | |
|---|---|---|---|
| 2019/0165221 A1 | 5/2019 | Amiya et al. | |
| 2021/0329848 A1* | 10/2021 | Ji | A01G 7/045 |
| 2022/0232679 A1* | 7/2022 | Robell | H05B 45/20 |
| 2022/0264728 A1* | 8/2022 | Yokoi | A01K 63/06 |

FOREIGN PATENT DOCUMENTS

| | | |
|---|---|---|
| JP | 5300993 A | 9/2013 |
| JP | 2013-201903 A | 10/2013 |
| JP | 2015-050958 A | 3/2015 |
| JP | 2017-221177 A | 12/2017 |
| JP | 2018-033368 A | 3/2018 |
| JP | 2019-050739 A | 4/2019 |
| WO | 2015/155914 A1 | 10/2015 |
| WO | 2019/139031 A1 | 7/2019 |
| WO | 2019/139301 A1 | 7/2019 |

\* cited by examiner

FIG. 13

| | N (mg/L) | $P_2O_5$ (mg/L) | $K_2O$ (mg/L) | MgO (mg/L) | CaO (mg/L) | Fe (mg/L) |
|---|---|---|---|---|---|---|
| First nutrient solution | 0.2~0.47 | 0.13~0.33 | 0.4~1 | 0.12~0.27 | 0.33~0.83 | 0.003~0.01 |
| Second nutrient solution | 0.06~0.14 | 0.04~0.1 | 0.12~0.3 | 0.04~0.08 | 0.1~0.25 | 0.001~0.003 |
| Third nutrient solution | 0.21~0.42 | - | - | - | - | - |
| Fourth nutrient solution | ≦0.01 | 0.2~0.4 | 0.72~1.2 | 0.12~0.24 | 0.54~0.8 | 0.007~0.024 |
| First reference nutrient solution | 1.3 | 0.6 | 2.03 | 1.15 | 0.0075 | 0.0135 |
| Second reference nutrient solution | 0.52 | 0.24 | 0.81 | 0.46 | 0.003 | 0.0054 |

VEGETABLE PRODUCTION METHOD

CROSS-REFERENCE TO RELATED APPLICATION

The present application is a National Phase entry based on PCT Application No. PCT/JP2020/047457 filed on Dec. 18, 2020, entitled "VEGETABLE PRODUCTION METHOD AND LETTUCE", which claims the benefit of Japanese Patent Application No. 2019-230015, filed on Dec. 20, 2019, entitled "VEGETABLE PRODUCTION METHOD AND LETTUCE". The contents of which are incorporated by reference herein in their entirety.

FIELD

Embodiments of the present disclosure relate generally to a vegetable production method and a lettuce.

BACKGROUND

Hydroponics is a known alternative to typical methods with soil for producing plants.

SUMMARY

A vegetable production method is described.

In one embodiment, a vegetable production method includes seeding, causing a cotyledon to sprout from a seed in a first period, growing a vegetable in a second period subsequent to the first period, further growing the vegetable in a third period subsequent to the second period, and harvesting the vegetable. The vegetable is grown with first light having a first maximum value of a light intensity in a wavelength range of 420 to 490 nm and including at least portion of light in a wavelength range of 500 to 600 nm in a later part of the second period, and is grown with second light having a second maximum value of a light intensity in a wavelength range of 590 to 650 nm, having a peak light intensity less than the second maximum value in a visible light wavelength range of less than or equal to 500 nm, and including light in a wavelength range of 500 to 590 nm in the first period, an earlier part of the second period, and the third period.

BRIEF DESCRIPTION OF DRAWINGS

FIG. 13 illustrates a table showing the main composition of each of a first nutrient solution, a second nutrient solution, a third nutrient solution, a fourth nutrient solution, a first reference nutrient solution, and a second reference nutrient solution.

DETAILED DESCRIPTION

Figure 1:
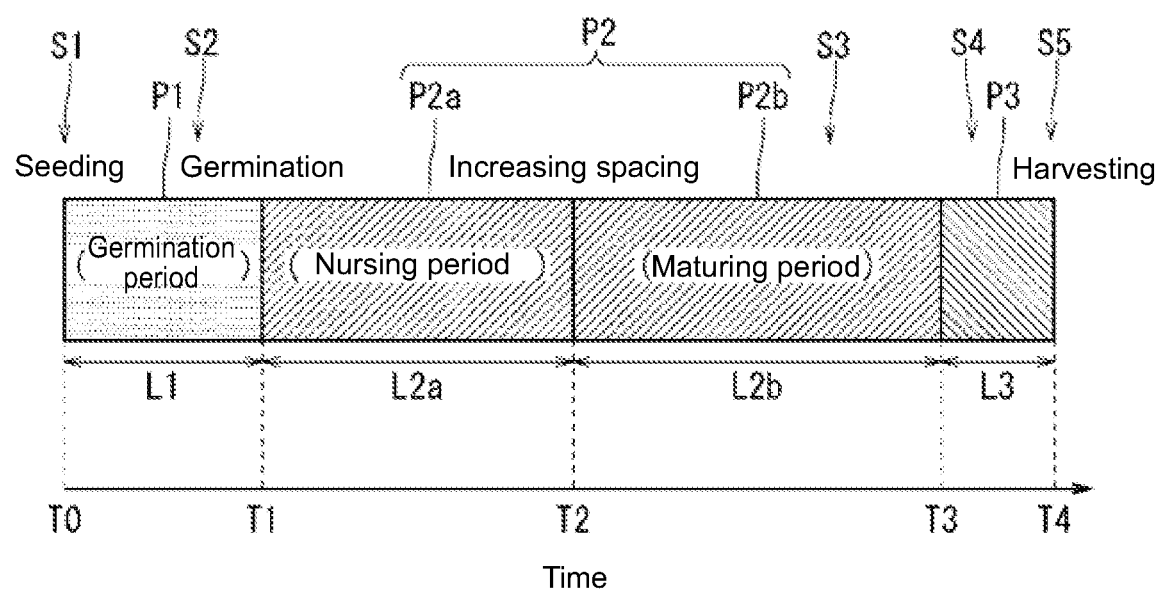
FIG. 1 illustrates a diagram of an example hydroponic growth period with a vegetable production method according to a first embodiment.

A first embodiment will now be described with reference to the drawings. Throughout the drawings, like reference numerals denote like structural or functional elements, and such elements will not be described repeatedly. The drawings are schematic. FIGS. 2A to 9B are expressed in a right-handed XYZ coordinate system, in which the direction along the long side of each illuminator 10 in the horizontal direction is a +X direction, the direction along the short side of each illuminator 10 in the horizontal direction is a +Y direction, and the upward direction orthogonal to the +X and +Y directions is a +Z direction.

1 First Embodiment

1-1 Overview of Hydroponic Vegetable Growth

As shown in FIG. 1, the period of hydroponic vegetable growth includes, for example, a first period P1, a second period P2, and a third period P3. The vegetable to be hydroponically grown (or a growth target vegetable) includes, for example, a leafy vegetable such as lettuce.

The first period P1 refers to the period (or a germination period) from seeding (time T0) to the start of nursing (time T1) including germination. The seeding time refers to the time of seeding on a nursery bed. The nursery bed may include, for example, sponge, polyurethane, or non-woven fabric. The germination time refers to the time at which cotyledons sprout from the seeds on the nursery bed. For the growth target vegetable being lettuce, for example, the cotyledons are two embryonic leaves. For lettuce, the period from seeding to the start of nursing including germination has a length L1 of, for example, about seven days.

The second period P2 refers to the period from the start of nursing (time T1) including germination to a time (time T3) a predetermined number of days before harvesting (time T4). The second period P2 refers to the period (or a main growth period) in which the vegetable mainly grows. The second period P2 is divided into, for example, an earlier part (or a second-A period) P2a and a later part (or a second-B period) P2b.

The second-A period P2a corresponds to a period for nursing (or a nursing period). For the growth target vegetable being lettuce, for example, the nursing period has a length L2a of about 7 to 14 days. At the end (time T2) of the second-A period P2a, the spacing between the grown seedlings is increased (the work of increasing spacing). The work of increasing spacing aims to avoid inhibition of photosynthesis resulting from overlapping leaves of neighboring grown vegetable plants and to increase room for growth of the plants. The work of increasing spacing includes, for example, transferring (or transplanting) the grown seedlings from the nursery bed to a growth medium in accordance with the degree of growth. The growth medium may include, for example, sponge, polyurethane, or non-woven fabric. The seedlings are transplanted to have spacing adjusted between, for example, the individual plants or rows. The work of increasing spacing may also be performed without transplanting the seedlings from the nursery bed to the growth medium. For example, the nursery bed may be divided to increase the spacing between the seedlings, or the seedlings may be thinned.

The second-B period P2b refers to the period (or a maturing period) in which the seedlings are grown into mature vegetable plants after the spacing is increased. For the growth target vegetable being lettuce, for example, the maturing period has a length L2b of about 10 to 16 days.

The third period P3 refers to the period in which the vegetable is further grown until harvesting (or a before-harvesting period). The before-harvesting period is a predetermined number of days before harvesting the vegetable. The before-harvesting period has a length L3 of, for example, about one to seven days. For the growth target vegetable being lettuce, for example, the length L3 is about four to seven days.

Thus, the hydroponic method for vegetable production includes, for example, first to fifth steps S1 to S5 to be performed in order. The first step S1 is seeding. The second step S2 is causing cotyledons to sprout from the seeds in the first period P1. The third step S3 is growing the vegetable in the second period P2 subsequent to the first period P1. The fourth step S4 is further growing the vegetable in the third period P3 subsequent to the second period P2. The fifth step S5 is harvesting the vegetable. The nursery bed and the growth medium for such hydroponic growth are each placed in a growing container, such as a tray, that contains a liquid culture medium (or a nutrient solution) for growing the vegetable. The nutrient solution contains a fertilizer component selected as appropriate. In the germination period, the seeds on the nursery bed are, for example, watered from above to stimulate germination of cotyledons from the seeds.

1-2 Structure of Growth Site for Hydroponic Growth

Figure 2A:
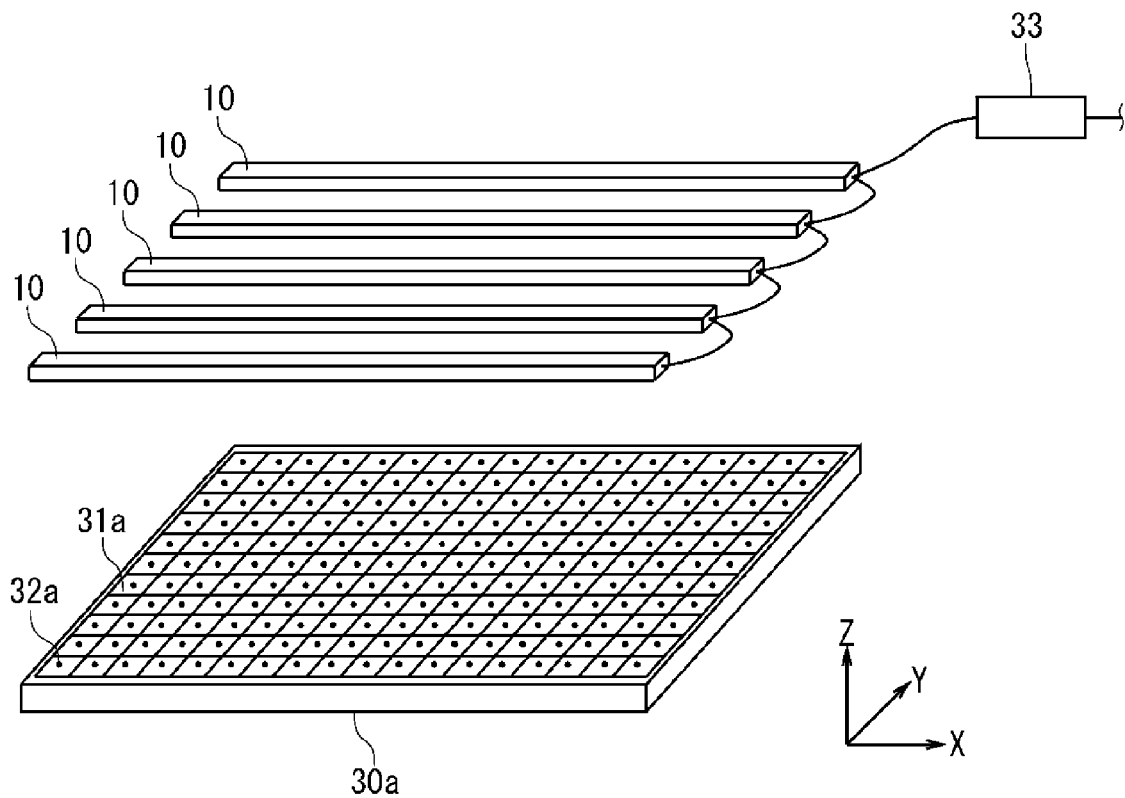
FIG. 2A illustrates a schematic perspective view of an example seeded growth site.
Figure 2B:
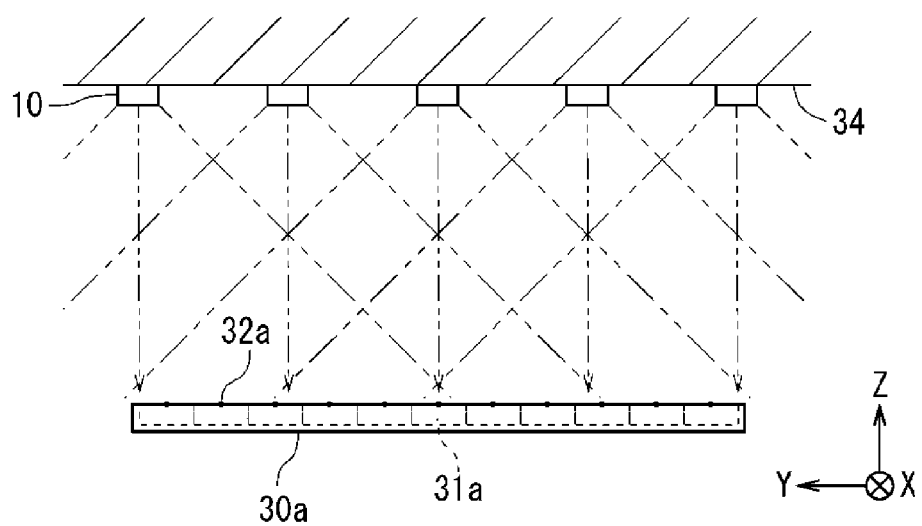
FIG. 2B illustrates a schematic left view of the seeded growth site in FIG. 2A.
Figure 3A:
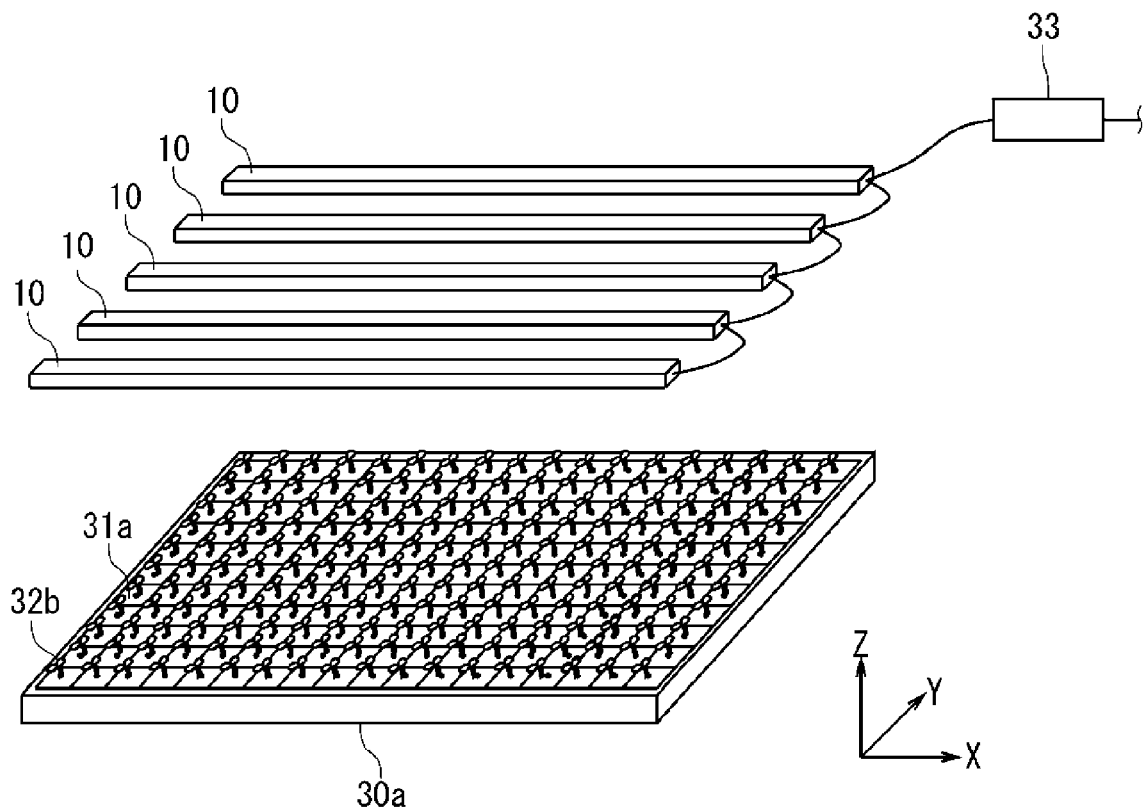
FIG. 3A illustrates a schematic perspective view of an example growth site with sprouts.
Figure 3B:
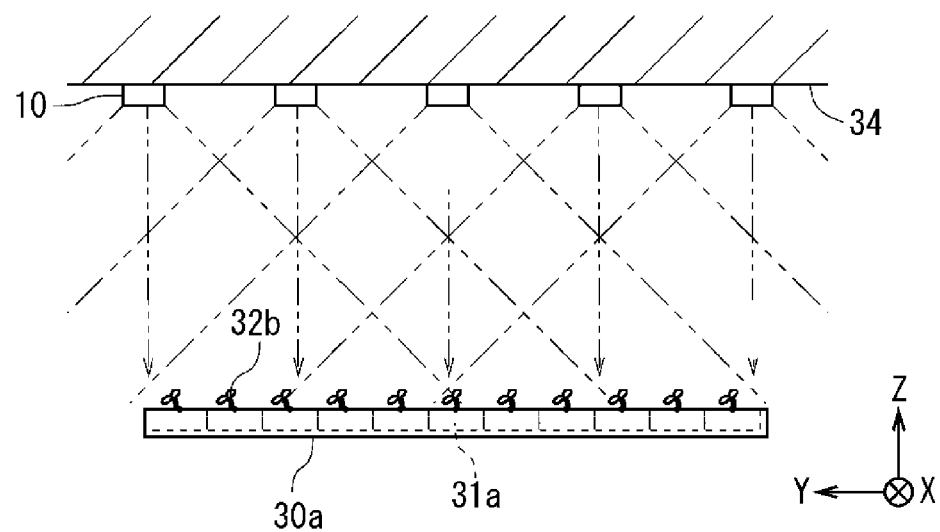
FIG. 3B illustrates a schematic left view of the growth site with sprouts in FIG. 3A.

For seeding, for example, multiple seeds 32a are placed with appropriate spacing on a nursery bed 31a located in an upper recess of a growing container 30a, as shown in FIGS. 2A and 2B. The container 30a is, for example, a growing tray. The growing tray has, for example, a rectangular profile as viewed from above to below (in the −Z direction). The container 30a contains a nutrient solution for growing the vegetable. The nursery bed 31a is immersed in the nutrient solution. Multiple illuminators 10 are arranged, for example, on a support 34 above the container 30a. The illuminators 10 are arranged, for example, in parallel to one another with appropriate spacing. Each illuminator 10 is powered by, for example, a power supply 33.

In the first period P1 as the germination period, for example, the illuminators 10 emit light from their light sources toward the seeds 32a for about 12 to 16 hours a day without using sunlight, as shown in FIG. 2B. The seeds 32a are watered to stimulate germination. This causes cotyledons to sprout from the seeds 32a to be vegetable seedlings 32b as shown in, for example, FIGS. 3A and 3B. In FIGS. 2B, 3B, 4B, 5B, and 6B, light emitted from the illuminators 10 has a traveling direction indicated by arrowed two-dot chain lines and has outer edges indicated by two-dot chain lines.

Figure 4A:
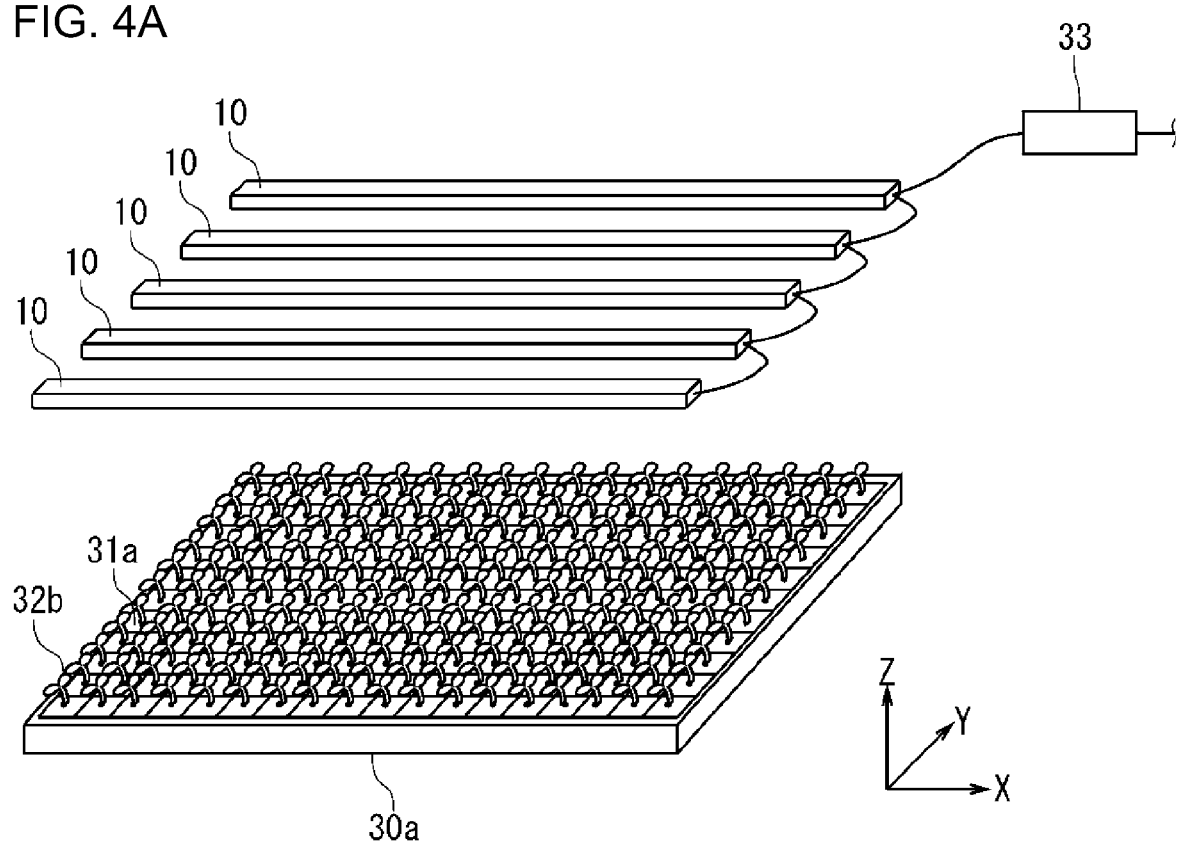
FIG. 4A illustrates a schematic perspective view of an example growth site in a nursing period.
Figure 4B:
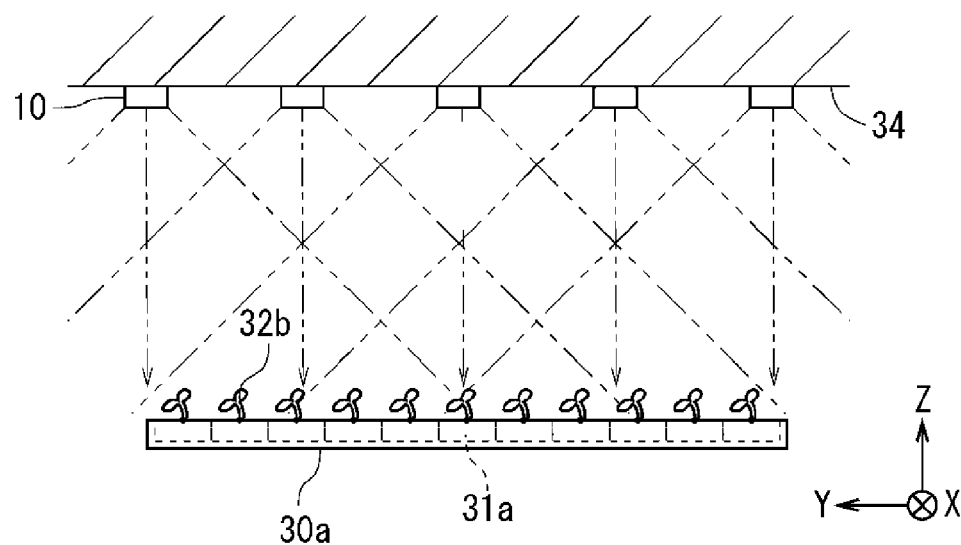
FIG. 4B illustrates a schematic left view of the growth site in the nursing period in FIG. 4A.

In the second-A period P2a as the nursing period, for example, the illuminators 10 emit light from their light sources toward the vegetable seedlings 32b for about 12 to 16 hours a day without using sunlight, as shown in FIGS. 4A and 4B. This promotes, for example, the growth of the vegetable seedlings 32b.

Figure 5A:
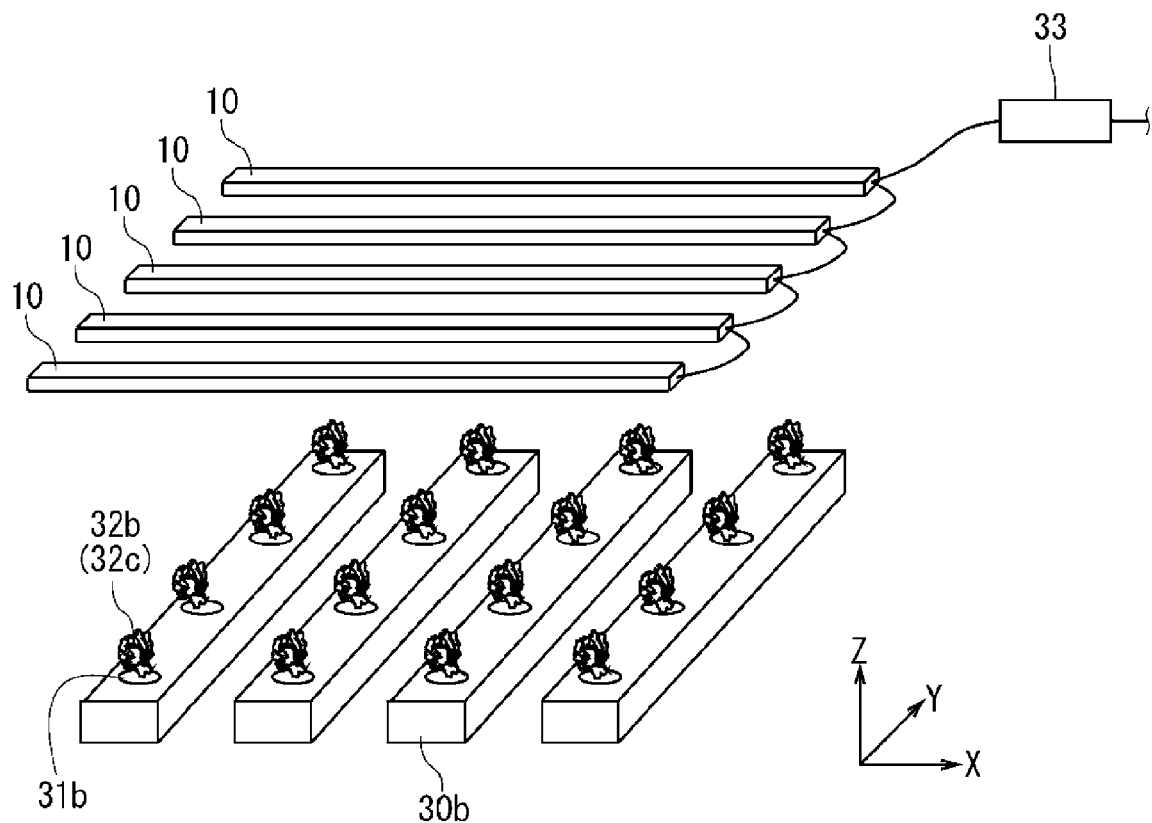
FIG. 5A illustrates a schematic perspective view of an example growth site with transplanted plants.
Figure 5B:
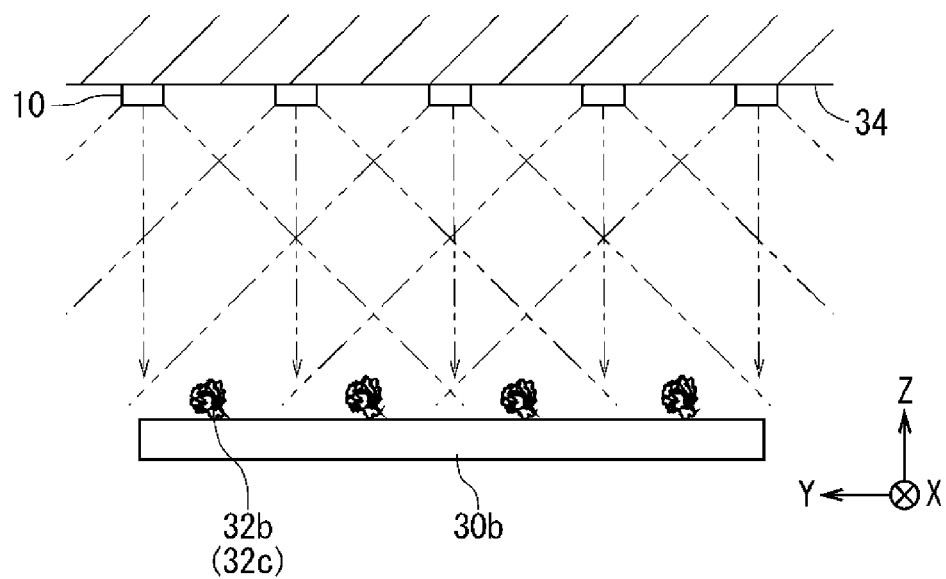
FIG. 5B illustrates a schematic left view of the growth site with transplanted plants in FIG. 5A.

After the nursing period, the vegetable seedlings 32b are, for example, transplanted. More specifically, for example, the vegetable seedlings 32b to be grown into multiple growth target vegetable plants 32c are placed with appropriate spacing on a growth medium 31b located in an upper recess of each growing container 30b, as shown in FIGS. 5A and 5B. The vegetable seedlings 32b and the growth target vegetable plants 32c are hereafter also collectively referred to as a vegetable as appropriate. Each container 30b is, for example, a growing tray. The growing tray has, for example, an elongated rectangular profile as viewed from above to below (in the −Z direction). In the example of FIGS. 5A and 5B, the elongated four containers 30b are substantially parallel to one another. Each container 30b contains a nutrient solution for growing the vegetable. The growth medium 31b is immersed in the nutrient solution. The illuminators 10 are arranged, for example, on the support 34 above the container 30b. The illuminators 10 are arranged in parallel to one another with appropriate spacing. In the examples of FIGS. 5A and 5B, each illuminator 10 has a long side orthogonal to the long side of each container 30b. Each illuminator 10 is powered by the power supply 33.

In the second-B period P2b as the maturing period, for example, the illuminators 10 emit light from their light sources toward the growth target vegetable plants 32c for about 12 to 16 hours a day without using sunlight, as shown in FIG. 5B. This promotes the growth of the growth target vegetable plants 32c.

Figure 6A:
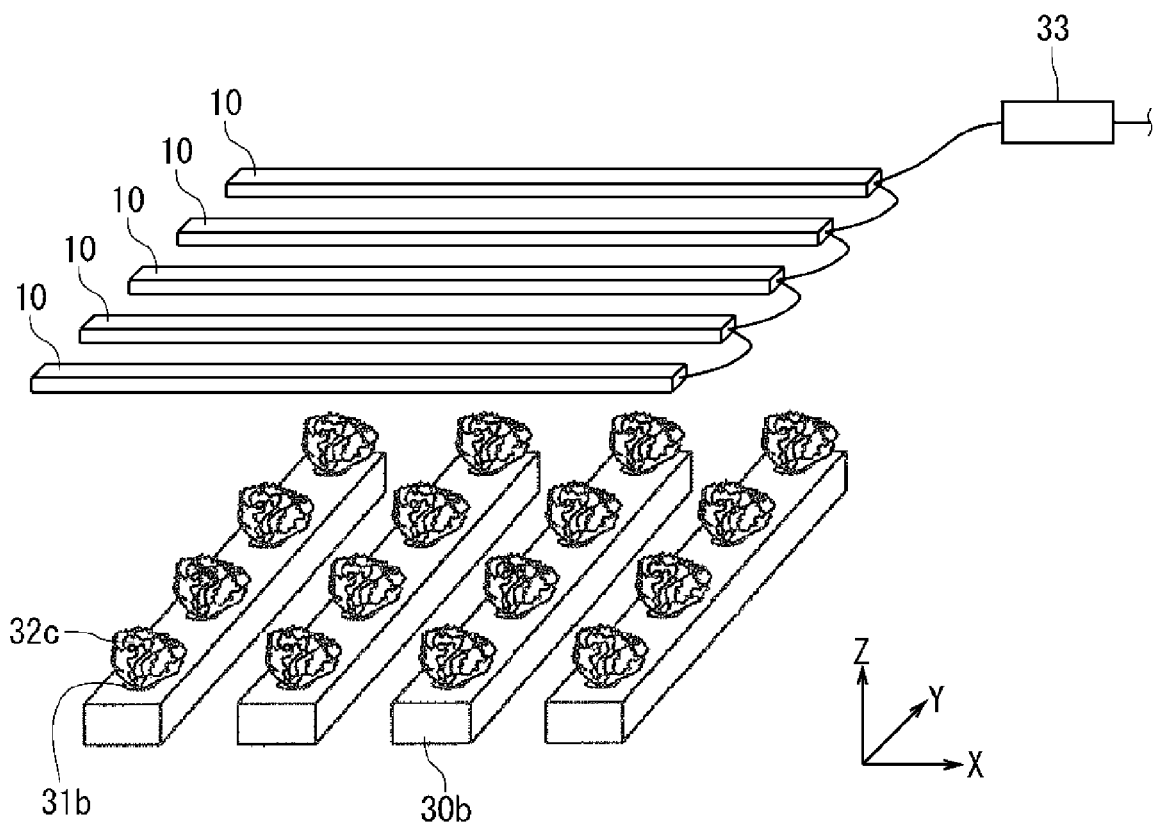
FIG. 6A illustrates a schematic perspective view of an example growth site in a growth period.
Figure 6B:
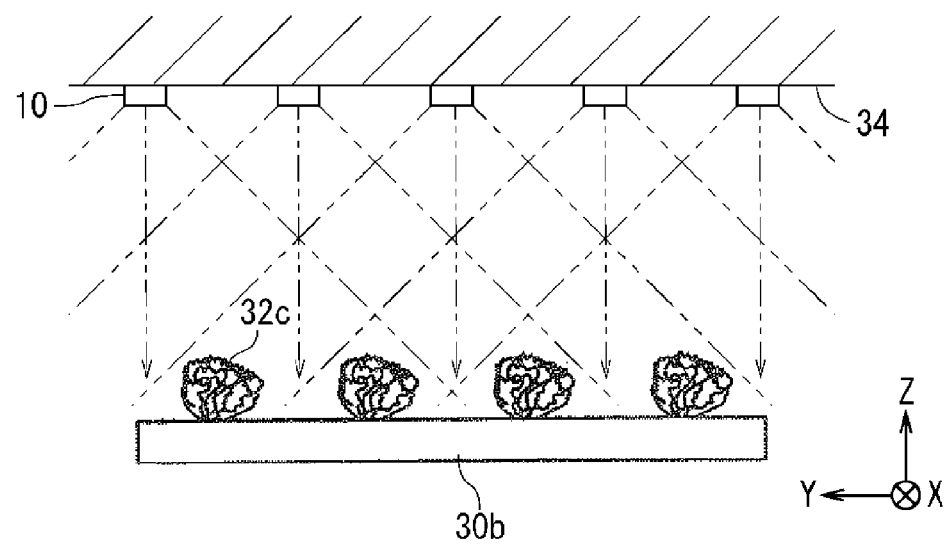
FIG. 6B illustrates a schematic left view of the growth site in the growth period in FIG. 6A.

In the third period P3 as the before-harvesting period, for example, the illuminators 10 emit light from their light sources toward the growth target vegetable plants 32c for about 12 to 16 hours a day without using sunlight, as shown in FIG. 6B. This promotes the growth of the growth target vegetable plants 32c as shown in FIGS. 6A and 6B.

For example, the illuminators 10 may be spaced from the seeds 32a, the vegetable seedlings 32b, or the growth target vegetable plants 32c by a distance adjusted appropriately.

The illuminators 10 may have the light sources that emit, for example, light with different spectra between the first period P1, the second-A period P2a, the second-B period P2b, and the third period P3. The illuminators 10 may have the light sources that emit, for example, light with different spectra between the second-A period P2a and the second-B period P2b.

As described above, the hydroponic method for vegetable production allows the growth target vegetable plants 32c to be grown without using sunlight.

1-3 Structure of Illuminator

Figure 7A:
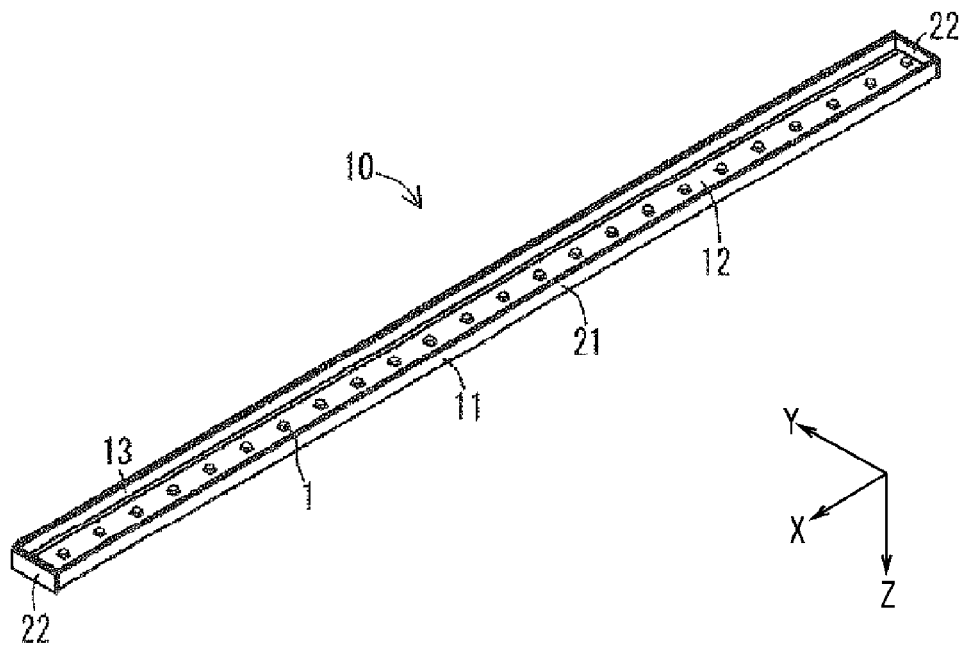
FIG. 7A illustrates an external perspective view of an example illuminator.
Figure 7B:
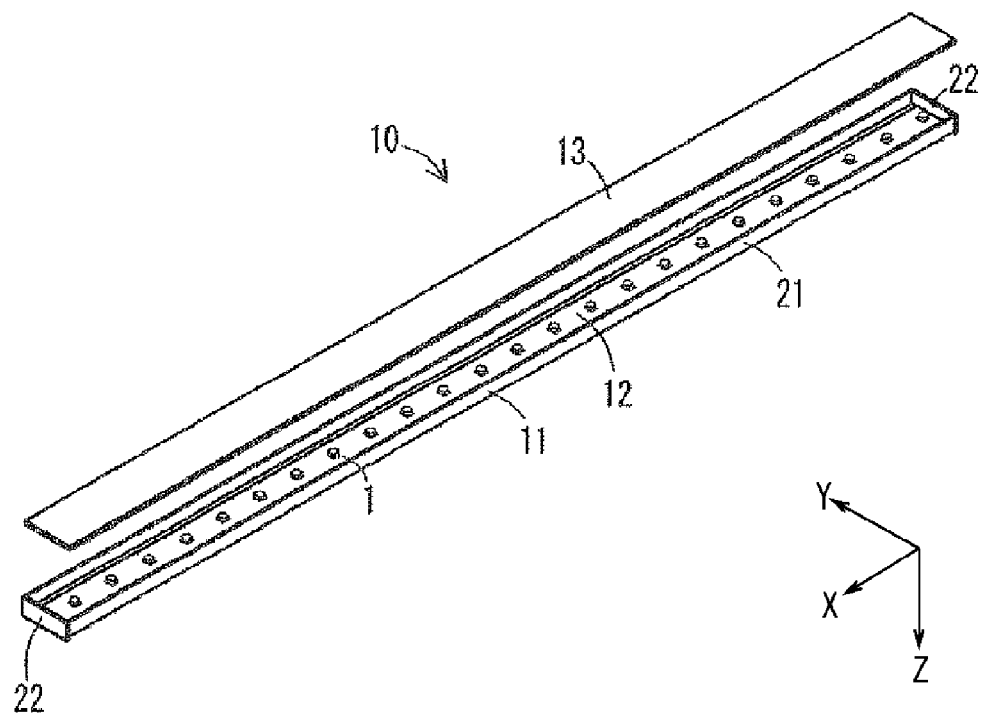
FIG. 7B illustrates a perspective view of the illuminator with a translucent substrate removed from a housing.
Figure 8:
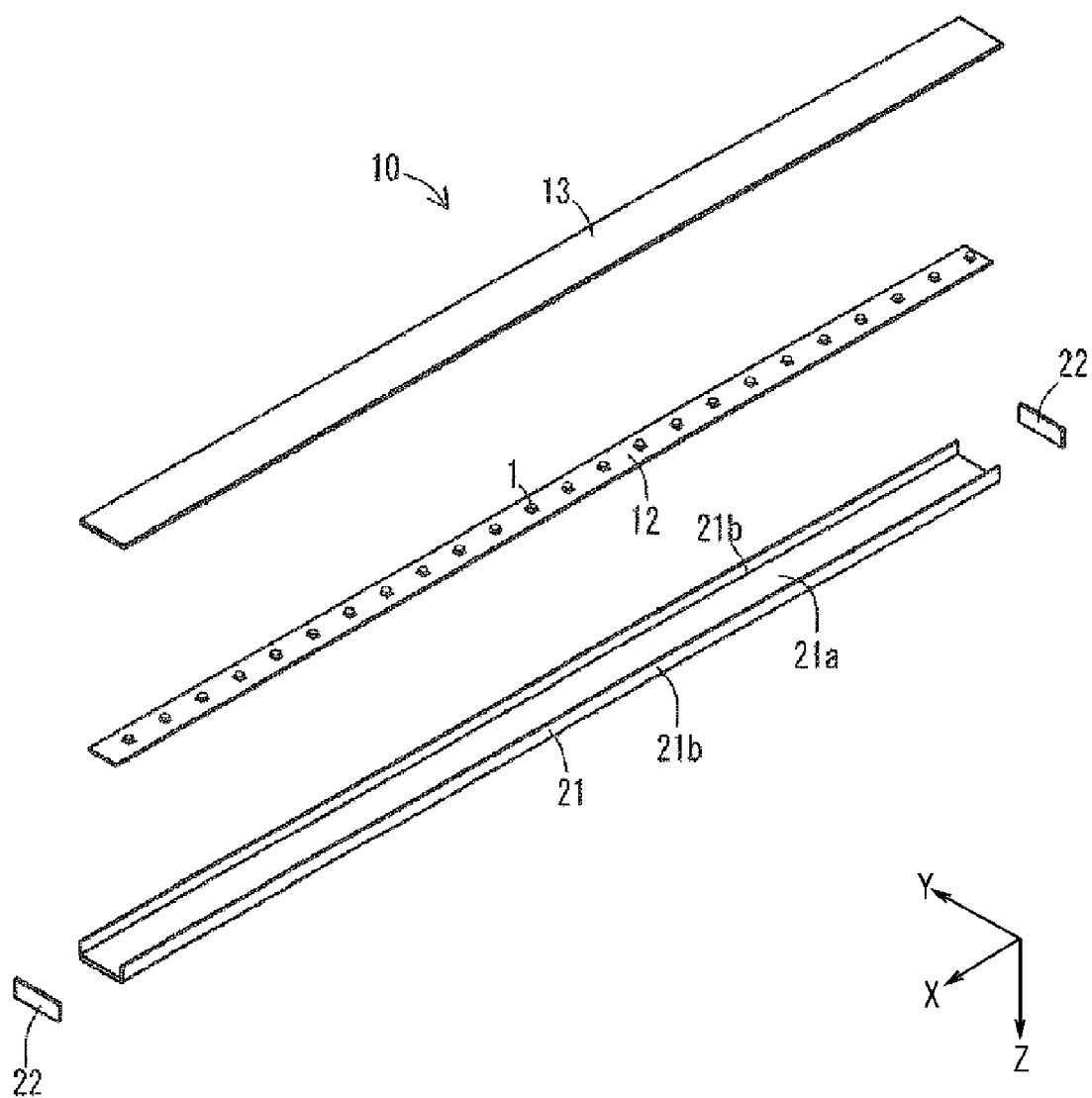
FIG. 8 illustrates an exploded perspective view of an example illuminator.

As shown in FIGS. 7A, 7B, and 8, each illuminator 10 includes, for example, a housing 11, a wiring board 12, multiple light sources 1, and a translucent substrate 13.

1-3-1 Housing

The housing 11 has, for example, an elongated rectangular profile with its long side in the +X direction, and is open in the −Z direction. For example, the housing 11 holds the translucent substrate 13 and dissipates heat generated by the light sources 1 outside. The housing 11 is formed from, for example, a metal such as aluminum, copper or stainless steel, or a plastic or a resin. The housing 11 includes, for example, an elongated body 21 with a bottom 21a and a pair of holders 21b, and two covers 22. For example, the bottom 21a has a long side in the +X direction. For example, the pair of holders 21b have a long side in the +X direction and protrude in the −Z direction from the bottom 21a at the two ends in the width direction (+Y direction). The body 21 is open in the −Z direction (downward) and open at the two ends in the +X direction (longitudinal direction). The two covers 22 cover, for example, the two open ends of the body 21 in the +X direction (longitudinal direction). The holders 21b each have, for example, a groove near the end in the −Z direction. Each groove extends in the +X direction to hold the translucent substrate 13. In other words, a pair of grooves face each other. The housing 11 is, for example, about 100 to 2000 millimeters (mm) in the longitudinal direction (+X direction).

1-3-2 Wiring Board

The wiring board 12 is, for example, fixed to the housing 11 inside the housing 11. The wiring board 12 is fixed to, for example, an inner surface of the housing 11 facing in the −Z direction. The wiring board 12 may be, for example, a printed board such as a rigid printed board, a flexible printed board, or a rigid flexible printed board.

1-3-3 Light Source

Figure 9A:
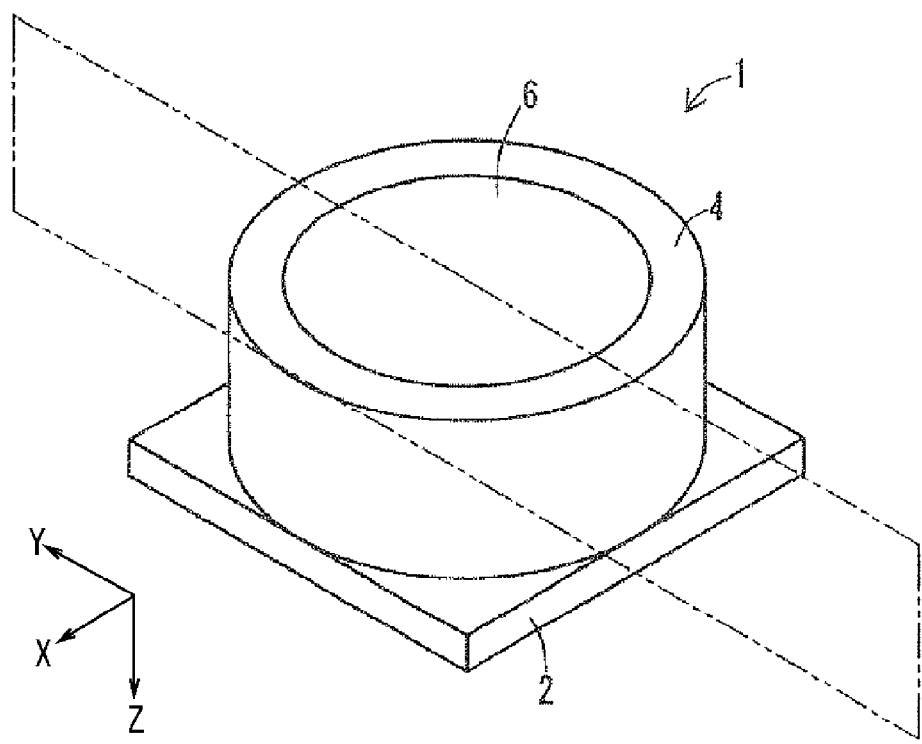
FIG. 9A illustrates an external perspective view of an example light source.
Figure 9B:
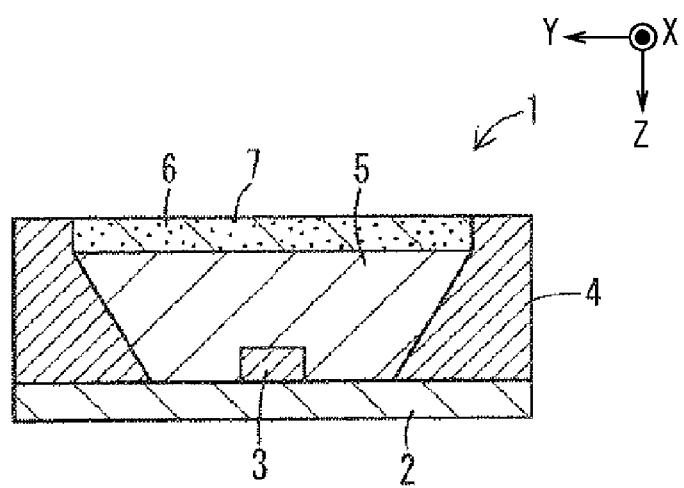
FIG. 9B illustrates a cross-sectional view of the light source in FIG. 9A taken along an imaginary plane indicated by the two-dot chain line.

The light sources 1 are, for example, mounted on the wiring board 12 in the housing 11 and are aligned along the long side of the housing 11. As shown in FIGS. 9A and 9B, each light source 1 includes, for example, a substrate 2, a light emitter 3, a frame 4, a seal 5, and a wavelength converter 6.

Substrate 2

The substrate 2 is, for example, an insulating substrate. The substrate 2 is formed from, for example, a ceramic such as alumina or mullite, or a glass ceramic. The substrate 2 may be formed from, for example, a composite material containing multiple different ceramics or containing a ceramic and a glass ceramic. The substrate 2 may be formed from, for example, a polymeric resin in which metallic oxide particles are dispersed. In this case, the substrate 2 can have its thermal expansion adjusted as appropriate. The substrate 2 includes, for example, a conductor (or a wiring conductor) that electrically connects the inside and the outside of the substrate 2. The wiring conductor is formed from, for example, a conductive material such as tungsten, molybdenum, manganese, or copper. The wiring conductor may be prepared by, for example, applying a metal paste containing powder of tungsten with an organic solvent in a predetermined pattern on a ceramic green sheet, which is to be the substrate 2, stacking multiple ceramic green sheets prepared in this manner on one another, and firing the structure. This completes the wiring conductor. The wiring conductor may include a plating layer of, for example, nickel or gold on its surface to decrease the oxidation of the wiring conductor. The substrate 2 may include a metallic reflective layer on the surface facing in the −Z direction and separate from the wiring conductor and the plating layer. The reflective layer can efficiently reflect light in the −Z direction. The reflective layer is formed from, for example, aluminum, silver, gold, copper, or platina. The wiring pattern on the substrate 2 is electrically connected to, for example, the wiring pattern on the wiring board 12 with solder or conductive adhesive. This allows, for example, a signal from the wiring board 12 to be transmitted to the light emitter 3 through the substrate 2 and causes the light emitter 3 to emit light. The wiring board 12 may be powered by an external power supply through wiring.

Light Emitter 3

The light emitter 3 is, for example, mounted on the substrate 2. The light emitter 3 is, for example, electrically connected on the plating layer on the surface of the wiring conductor on the substrate 2 with brazing material or solder. The light emitter 3 is, for example, a light-emitting diode (LED) including a semiconductor with electrons and holes at a p-n junction recombining to emit light. The light emitter 3 includes a translucent base and an optical semiconductor layer on the translucent base. For example, the translucent base allows the optical semiconductor layer to be deposited by chemical vapor deposition, such as metal organic chemical vapor deposition or molecular beam epitaxy. The translucent base may be formed from, for example, sapphire, gallium nitride, aluminum nitride, zinc oxide, zinc selenide, silicon carbide, silicon, or zirconium diboride. The translucent base has a thickness of, for example, about 50 to 1000 micrometers (μm). The optical semiconductor layer includes, for example, a first semiconductor layer, an emissive layer, and a second semiconductor layer. The first semiconductor layer is located, for example, on the translucent base. The emissive layer is located, for example, on the first semiconductor layer. The second semiconductor layer is located, for example, on the emissive layer. The first semiconductor layer, the emissive layer, and the second semiconductor layer are each formed from, for example, a III-V semiconductor such as a nitride semiconductor, gallium phosphide, or gallium arsenide. The nitride semiconductor includes, for example, gallium nitride, aluminum nitride, or indium nitride. The first semiconductor layer has a thickness of, for example, about 1 to 5 μm. The emissive layer has a thickness of, for example, about 25 to 150 nanometers (nm). The second semiconductor layer has a thickness of, for example, about 50 to 600 nm. The light emitter 3 with the above structure may emit excitation light with a wavelength range of, for example, about 370 to 420 nm.

Frame 4

For example, the frame 4 surrounds the light emitter 3 on the substrate 2. The frame 4 is formed from a resin material mixed with powder of, for example, a ceramic material such as aluminum oxide, titanium oxide, zirconium oxide, or yttrium oxide, a porous material, or a metallic oxide such as aluminum oxide, titanium oxide, zirconium oxide, or yttrium oxide. The frame 4 is, for example, placed on and connected to the substrate 2 with a resin. For example, the frame 4 surrounds the light emitter 3 out of contact with the light emitter 3. For example, the frame 4 has an inner wall flared outward from the end in the +Z direction toward the end in the −Z direction. In other words, the frame 4 has the inner wall inclined, for example, relative to Z-axis to have the inner space having a cross-section along the XY plane being larger toward the end in the −Z direction. In this case, for example, the inner wall of the frame 4 serves as a surface (or a reflective surface) for reflecting excitation light emitted from the light emitter 3. The inner wall of the frame 4 may be, for example, circular as viewed from above in the +Z direction. This allows the reflective surface to reflect light emitted from the light emitter 3 in all directions. The frame 4 is, for example, a sintered body and includes a metal layer on its inner periphery or inner wall and a plating layer (or a plating metal layer) covering the metal layer. The metal layer is formed from, for example, tungsten, molybdenum, copper, or silver. The plating metal layer may be formed from, for example, nickel or gold. The plating metal layer can reflect, for example, light emitted by the light emitter 3. In other words, the inner wall of the frame 4 can serve as a reflective surface for reflecting light emitted from the light emitter 3. The inner wall of the frame 4 is inclined relative to the XY plane at an angle of, for example, about 55 to 70 degrees.

Seal 5

The seal 5 fills, for example, the inner space of the frame 4 except an area adjacent to the end of the frame 4 in the −Z direction. The seal 5 can thus seal, for example, the light emitter 3. The seal 5 is, for example, translucent to transmit light emitted from the light emitter 3. The seal 5 may be formed from, for example, a translucent insulating resin, such as a silicone resin, an acrylic resin, or an epoxy resin. The seal 5 has a refractive index of, for example, about 1.4 to 1.6.

Wavelength Converter 6

The wavelength converter 6 is located, for example, in the inner space of the frame 4 adjacent to the end of the frame 4 in the −Z direction. The wavelength converter 6 is located, for example, on the surface of the seal 5 facing in the −Z direction. For example, the wavelength converter 6 fits inside the frame 4. The wavelength converter 6 can convert, for example, the wavelength of light emitted from the light emitter 3. The wavelength converter 6 includes, for example, a phosphor 7. More specifically, the wavelength converter 6 is formed from, for example, a translucent insulating resin or glass containing the phosphor 7. The insulating resin is formed from, for example, a translucent insulating resin, such as a fluororesin, a silicone resin, an acrylic resin, or an epoxy resin. The wavelength converter 6 contains, for example, many particles of phosphor 7 dispersed substantially uniformly. In response to light emitted from the light emitter 3 and entering the wavelength converter 6, for example, the phosphor 7 is excited to emit light. The material of the phosphor 7 may be determined as appropriate, for example, to change the spectrum of light emitted from each light source 1.

1-3-4 Translucent Substrate

For example, the translucent substrate 13 covers the opening of the housing 11 facing in the −Z direction. The translucent substrate 13 is formed from a material that transmits light emitted from the light sources 1. The translucent substrate 13 is formed from, for example, an acrylic resin or glass. The translucent substrate 13 is, for example, a rectangular plate with front and back surfaces. The translucent substrate 13 is, for example, about 98 to 1998 mm in the longitudinal direction (+X direction). The translucent substrate 13 is inserted in the pair of grooves in the pair of holders 21b through either of the open ends of the body 21 in the longitudinal direction (+X direction), or specifically the open end in the +X or —X direction. The translucent substrate 13 is then slid in the +X direction, and thus is held by the pair of holders 21b at positions spaced from the light sources 1 in the −Z direction. In each illuminator 10, the covers 22 cover the open ends of the body 21 in the longitudinal direction (+X direction), or specifically the open ends in the +X and —X directions.

1-4 Illumination Conditions for Hydroponic Growth

In the above hydroponic growth, for example, the illuminators 10 for illuminating the vegetable can be changed as appropriate to change the illumination conditions for growing the vegetable.

1-4-1 Illumination with First Light

In the first embodiment, for example, in the third step S3 in hydroponic vegetable growth, the vegetable is grown with light (or first light) having the maximum value of the light intensity (or a first maximum value) in the visible light wavelength range of less than or equal to 500 nm, or specifically 420 to 490 nm, in at least a partial period in the second period P2. This increases, for example, the glutamine and sugar contents in the vegetable, improving the taste of the harvested vegetable. The light intensity (W/m$^2$/nm) refers to the irradiance of light per unit area and per unit wavelength. To describe the relationship between light intensities in the spectrum of light, for example, relative values of light intensities (or relative light intensities) are used as appropriate with the maximum value of the light intensity as a reference value (e.g., 1).

For example, the vegetable is grown with the first light in at least the partial period in the second period P2. This increases the glutamine and sugar contents in the harvested vegetable. This may occur with the mechanism below.

In the second period P2, the vegetable seedlings 32b and the growth target vegetable plants 32c (or the vegetable) are subjected to stress with the first light and produce reactive oxygen species in their cells. To protect its tissue from reactive oxygen species, for example, the vegetable activates the citric acid cycle and produces a large amount of antioxidants such as citric acid. For example, α-ketoglutaric acid (2-oxoglutaric acid) and glutamic acid are increased. The vegetable promotes, for example, reactions in the reaction cycle catalyzed by glutamine synthase (GS) and glutamate synthase (GOGAT) (or the GS-GOGAT cycle). In this GS-GOGAT cycle, for example, ammonium absorbed from plant roots is catalyzed by glutamine synthase (GS) to combine with glutamic acid to produce glutamine. The glutamine resulting from this reaction is catalyzed by glutamate synthase (GOGAT) to react with 2-oxoglutaric acid to produce two molecules of glutamic acid. Of the two molecules of glutamic acid produced, one molecule is used for a reaction catalyzed by glutamine synthase (GS) to combine with ammonium absorbed from the plant roots. The other molecule of glutamic acid is used to synthesize other amino acids. The reactions in the GS-GOGAT cycle are promoted to increase, for example, glutamine as a precursor of glutamic acid for producing glutamic acid. Ammonium used in the GS-GOGAT cycle is supplied, for example, from ammonia nitrogen and nitrate nitrogen in the nutrient solution. Nitrate nitrogen is, for example, reduced to ammonia nitrogen in roots and leaves and is thus the source of ammonium. Glutamine synthase (GS) is, for example, an enzyme contained in the vegetable in its chloroplasts. Glutamate synthase (GOGAT) is, for example, an enzyme contained in the vegetable.

To protect its tissue from reactive oxygen species, for example, the vegetable also produces antioxidants such as ascorbic acid and polyphenols. Ascorbic acid and polyphenols are, for example, synthesized using sugars such as glucose and galactose. The vegetable thus accumulates, for example, antioxidants sufficient to protect its tissue and also increases sugars as precursors of antioxidants.

Figure 10:
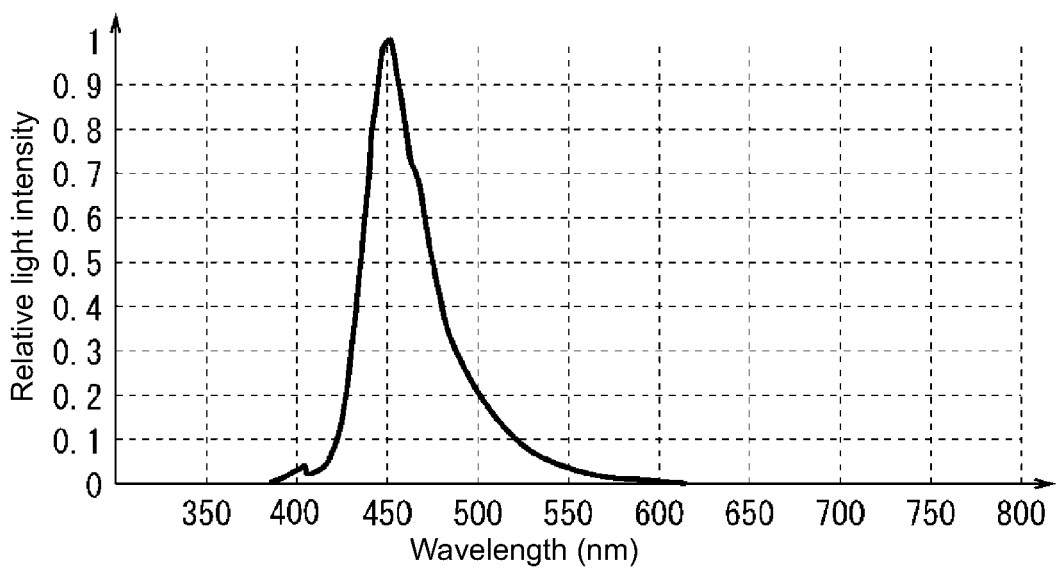
FIG. 10 illustrates a graph showing a spectrum of first light from light sources indicated by a thick solid line.

The phosphor 7 included in the wavelength converter 6 in each light source 1 may be a blue phosphor that shows fluorescence of, for example, about 420 to 490 nm to illuminate the vegetable with the first light. The blue phosphor may be, for example, $(Sr, Ca, Ba)_{10}(PO_4)_6Cl_2$:Eu. In this case, the light sources 1 can emit light having the spectrum indicated by the thick solid line in FIG. 10. The first light may contain, for example, red light components. However, the light sources 1 may consume, for example, less energy with the first light containing a lower percentage of red light components. The first light for illuminating the vegetable has a photon flux density of, for example, greater than or equal to 80 micromoles per square meter (80 µmol/m$^2$). The first light for illuminating the vegetable may have a photon flux density of, for example, about 100 to 250 µmol/m$^2$.

In the period of hydroponic vegetable growth, for example, the third step S3 includes the partial period (or a first light illumination period) in which the vegetable is grown with the first light. The partial period may be determined as appropriate. This can increase the glutamine and sugar contents in the vegetable moderately. For example, the first light illumination period may include a later part (second-B period) P2*b* of the second period P2. For example, the first light illumination period may have a length of ¼ to ½ of the total length of the first period P1, the second period P2, and the third period P3. More specifically, for example, the first light illumination period may be determined to be the second-B period P2*b*. The first light illumination period can thus be determined as appropriate, for example, to grow the vegetable and increase the glutamine and sugar contents in the vegetable in a well-balanced manner. This allows, for example, efficient production of the vegetable with improved taste. In the second-B period P2*b* in the third step, for example, the growth target vegetable plants 32*c* may be illuminated with the first light with an increased photon flux density (amount of light). This may increase the glutamine content in the harvested vegetable.

1-4-2 Illumination with Second Light

In the first embodiment, for example, in the second step S2 to the fourth step S4 in hydroponic vegetable growth, the vegetable may be grown with light (or second light) having the maximum value of the light intensity (or a second maximum value) in the visible light wavelength range of greater than 500 nm in a period other than the first light illumination period. This avoids, for example, excessive antioxidants produced in the vegetable to decrease bitterness caused by excessive antioxidants, and also increases the sugar content in the harvested vegetable. This improves, for example, the taste of the vegetable.

For example, the vegetable is grown with the second light in a period other than the first light illumination period. This avoids excessive increase in antioxidants in the harvested vegetable and increases the sugar content. This may occur with the mechanism below. The mechanism below is based on the photosynthetic response curve in FIG. 11 indicating the average of the photosynthetic response curves for 61 different plants presented by McCree (1972) and Inada (1976).

The second light, which promotes photosynthesis in the vegetable more than the first light, is used for illumination after illumination with the first light, for example. This decreases stress on the vegetable. This avoids, for example, the increase in reactive oxygen species and excessive antioxidants produced in the vegetable. Illumination with the second light promotes, for example, normal photosynthesis rather than the production of reactive oxygen species in the vegetable. This reduces, for example, organic acids and promotes the production of amino acids to be used for vegetable growth. This also stops the activation of the citric acid cycle resulting from illumination with the first light, for example, and promotes sugar production by reduction using the organic acids produced in the citric acid cycle.

The second light contains, for example, many light components in the red wavelength range. More specifically, for example, the second light may have the maximum value of the light intensity (or the maximum light intensity) in the wavelength range of 590 to 650 nm, the light intensity value (or a first value) at a wavelength of 700 nm being greater than or equal to 20 percent of the maximum light intensity, and the light intensity value (or a second value) at a wavelength of 800 nm being less than or equal to 10 percent of the maximum light intensity. This second light, which promotes photosynthesis in the vegetable more than the first light, can be used for illumination, for example, to promote normal photosynthesis in the vegetable rather than the production of reactive oxygen species. For example, the second light contains a wide range of light components with wavelengths that largely contribute to promotion of photosynthesis. The second light contains a low proportion of light components with wavelengths that contribute less to promotion of photosynthesis. This promotes, for example, vegetable growth and also decreases energy consumption for illumination, allowing efficient production of the vegetable with improved taste.

In the spectrum of the second light, a first wavelength λ1 (nm) is defined as a wavelength at which the light intensity is at peak (the maximum light intensity). In the spectrum of the second light, a second wavelength λ2 (nm) is defined as a wavelength at which the light intensity is 50 percent (%) of the light intensity at the first wavelength λ1 and shorter than and closest to the first wavelength λ1. In the spectrum of the second light, a third wavelength λ3 (nm) is defined as a wavelength at which the light intensity is 50% of the light intensity at the first wavelength λ1 and longer than and closest to the first wavelength λ1. In this case, for example, the spectrum of the second light has the maximum light intensity in the wavelength range of 610 to 630 nm, and satisfies Formulas 1 and 2.

$$\lambda1-70 \leq \lambda2 \leq \lambda1-30 \tag{1}+$$

$$\lambda130 \leq \lambda3 \leq \lambda1+70 \tag{2}$$

For example, the second light with the first wavelength λ1 in the range of 615 to 625 nm may contain fewer light components in the wavelength range of greater than or equal to 750 nm that contribute less to promotion of photosynthesis. In light from the red phosphor in the second light, for example, the percentage of the photon flux in the wavelength range of 610 to 630 nm to the photon flux in the wavelength range of 540 to 700 nm may be 15 to 25%. The second light emitted from the light sources 1 thus does not contain an excessive amount of light with a specific wavelength in the red light wavelength range of 540 to 700 nm that largely contributes to promotion of photosynthesis. The second light contains a low percentage of near-infrared light that contributes less to promotion of photosynthesis and can decrease the rate of photosynthesis. The absolute value of the difference between the first wavelength λ1 and the third wavelength λ3 may be, for example, greater than the absolute value of the difference between the first wavelength λ1 and the second wavelength λ2. This allows the second light to contain a higher percentage of light components near 670 nm, which is the peak wavelength in the red wavelength range in the photosynthetic response curve in FIG. 11.

Figure 11:
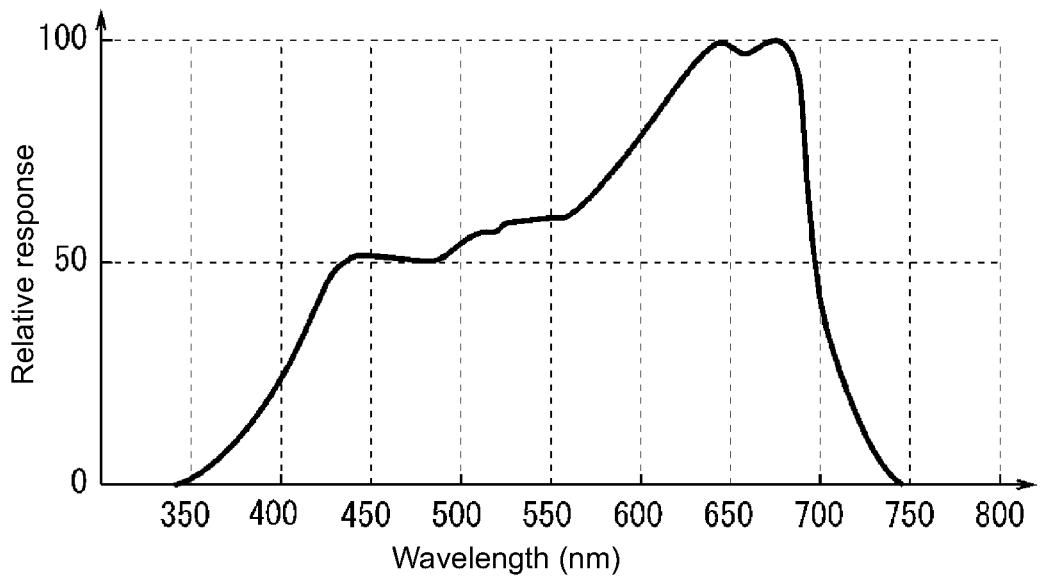
FIG. 11 illustrates a graph showing a photosynthetic response curve in a thick solid line indicating the degree to which light affects photosynthesis for each wavelength.

The second light may contain, for example, light components in the blue to violet wavelength range. For example, the second light may further have a peak of the light intensity (or a peak light intensity) less than the maximum light intensity in the visible light wavelength range of less than or equal to 500 nm. This increases, for example, the glutamine and sugar contents in the vegetable in the period with illumination with the second light as well. The photosynthetic response curve in FIG. 11 shows, for example, light in the blue light wavelength range of 420 to 490 nm also contributes to photosynthesis. The spectrum of the second light may thus have a peak, for example, in the wavelength range of 420 to 490 nm for the light components emitted from the blue phosphor. In the spectrum of the second light, for example, a fourth wavelength λ4 (nm) is defined as a wavelength at which the light intensity is at peak in the wavelength range of 420 to 490 nm, and the light intensity (relative light intensity) at the first wavelength λ1 is defined as 1. In the spectrum of this second light, for example, the light intensity (relative light intensity) at the fourth wavelength λ4 may be 0.3 to 0.5, and the percentage of the photon flux of light from the blue phosphor in the wavelength range of 420 to 490 nm to the photon flux of light from the red phosphor in the wavelength range of 540 to 700 nm may be 10 to 20%. In this case, the second light can contain red light and blue light to be used for photosynthesis in a well-balanced manner.

The second light may also contain, for example, light components in the green wavelength range. The photosynthetic response curve in FIG. 11 shows, for example, light in the green light wavelength range of 490 to 540 nm also contributes to photosynthesis to a certain degree. The spectrum of the second light may thus contain a moderate amount of light components emitted from the green phosphor in the wavelength range of 490 to 540 nm. More specifically, with the light intensity (relative light intensity) at the first wavelength λ1 being 1, for example, the spectrum of the second light may have the light intensities (relative light intensities) in the wavelength range of 490 to 540 nm having an average value of greater than or equal to 0.1, or greater than or equal to 0.3. In the spectrum of the second light, for example, the percentage of the photon flux of light from the green phosphor in the wavelength range of 490 to 540 nm to the photon flux of light from the red phosphor in the wavelength range of 540 to 700 nm may be 5 to 15%. In the spectrum of the second light, for example, the percentage of the photon flux of light from the green phosphor in the wavelength range of 490 to 540 nm to the photon flux of light from the blue phosphor in the wavelength range of 420 to 490 nm may be 45 to 65%. In this case, the second light can contain red light, blue light, and green light to be used for photosynthesis in a well-balanced manner. The leaf has, for example, photosynthetic tissue differentiated into palisade tissue on the front side of the leaf and spongy tissue on the back side of the leaf. Red light and blue light are absorbed by chloroplasts in the palisade tissue on the front side of the leaf to contribute to photosynthesis. Green light is, for example, not easily absorbed by chloroplasts. However, green light passes through palisade tissue on the front side of the leaf to spongy tissue on the back side of the leaf, at which green light is repeatedly scattered. The scattered green light is absorbed in chloroplasts to contribute to photosynthesis. The second light may thus contain, for example, a moderate amount of green light to promote photosynthesis.

Light emitted from the light emitters 3 in the light sources 1 includes excitation light in the near-ultraviolet range. The spectrum of the second light may thus have a peak in, for example, the wavelength range of 380 to 420 nm. In the spectrum of the second light, for example, a fifth wavelength λ5 (nm) is defined as a wavelength at which the light intensity is at peak in the wavelength range of 380 to 420 nm, and the light intensity (relative light intensity) at the first wavelength λ1 is defined as 1. In the spectrum of the second light in this case, for example, the light intensity (relative light intensity) at the fifth wavelength λ5 may be 0.2 to 0.4, and the percentage of the photon flux in the wavelength range of 380 to 420 nm to the photon flux of light from the red phosphor in the wavelength range of 540 to 700 nm may be 1 to 10%.

For example, the second light emitted from the light sources 1 may have a color temperature in the range of 1900 to 2100 K, an average color rendering index (Ra) in the range of 70 to 75, and the x and y coordinates on the CIE chromaticity diagram satisfying 0.4≤x≤0.5 and 0.3≤y≤0.4.

The phosphor 7 contained in the wavelength converter 6 in each light source 1 may include, for example, a blue phosphor containing $(Sr, Ca, Ba)_{10}(PO_4)_6Cl_2$:Eu, a green phosphor containing $(Sr, Ba, Mg)_2SiO_4$:Eu$^{2+}$ and a red phosphor containing $(Sr, Ca)AlSiN_3$:Eu at a compounding ratio of 3:1:46. This allows illumination with the second light satisfying the above conditions. In this case, the light sources 1 can emit light having the spectrum indicated by the thick solid line in FIG. 12.

Figure 12:
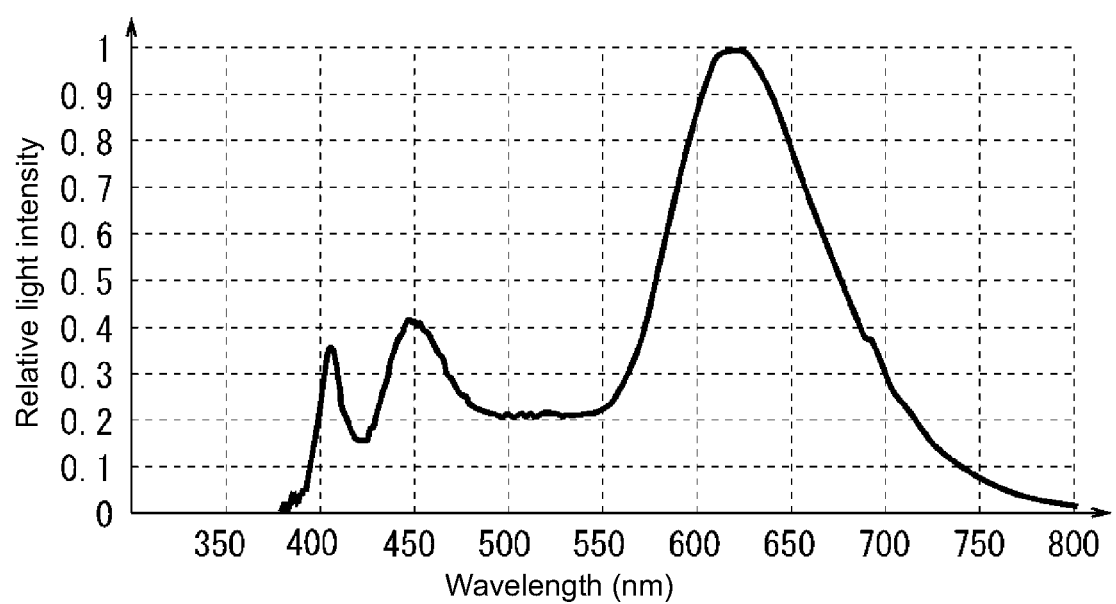
FIG. 12 illustrates a graph showing a spectrum of second light from light sources indicated by a thick solid line.

The spectrum in FIG. 12 has the characteristics below. In the wavelength range of light from the red phosphor, the first wavelength λ1 with the maximum light intensity is about 616 nm, the second wavelength λ2 is about 578 nm, the third wavelength λ3 is about 677 nm, and the width at half of the maximum light intensity is about 100 nm. The difference between the first wavelength λ1 and the third wavelength λ3 has an absolute value of about 61 nm that is greater than the absolute value of about 38 nm of the difference between the first wavelength λ1 and the second wavelength λ2. In light from the red phosphor, the percentage of the photon flux in the wavelength range of 610 to 630 nm to the photon flux in the wavelength range of 540 to 700 nm is about 20%. With the fourth wavelength λ4 being about 453 nm at which the light intensity is at peak in the wavelength range of light from the blue phosphor and the light intensity (relative light intensity) at the first wavelength λ1 being 1, the light intensity (relative light intensity) at the fourth wavelength λ4 is about 0.41, and the percentage of the photon flux of light from the blue phosphor in the wavelength range of 420 to 490 nm to the photon flux of light from the red phosphor in the wavelength range of 540 to 700 nm is about 15%.

With the light intensity (relative light intensity) at the first wavelength λ1 being 1, the light intensities (relative light intensities) of light from the green phosphor in the wavelength range of 490 to 540 nm have an average value of about 0.21. The percentage of the photon flux of light from the green phosphor in the wavelength range of 490 to 540 nm to the photon flux of light from the red phosphor in the wavelength range of 540 to 700 nm is about 8.5%. The percentage of the photon flux of light from the green phosphor in the wavelength range of 490 to 540 nm to the photon flux of light from the blue phosphor in the wavelength range of 420 to 490 nm is about 56%. With the fifth wavelength λ5 being about 406 nm and the light intensity (relative light intensity) at the first wavelength λ1 being 1, the light intensity (relative light intensity) at the fifth wavelength λ5 is about 0.36.

The second light for illuminating the vegetable has a photon flux density of, for example, greater than or equal to 80 μmol/m². The second light for illuminating the vegetable may have a photon flux density of, for example, about 100 to 250 μmol/m².

1-5 Conditions for Nutrient Solution for Hydroponic Growth

In the above hydroponic growth, for example, the nutrient solution in each of the growing containers 30a and 30b can be changed as appropriate to change the nutrients for growing the vegetable.

1-5-1 First Nutrient Solution

In the first embodiment, for example, in the third step S3 in hydroponic vegetable growth, the vegetable may be grown with a first nutrient solution in the first light illumination period in which the vegetable is grown with the first light. The first nutrient solution is, for example, a liquid culture medium with a nitrogen (N) content of 0.2 to 0.47 mg per liter and a calcium oxide (CaO) content of 0.33 to 0.83 mg per liter. This can increase, for example, the sugar content in the vegetable and decrease the nitrate concentration in the vegetable at harvest.

The contents of nitrogen (N), phosphorus pentoxide ($P_2O_5$), potassium oxide ($K_2O$), magnesium oxide (MgO), calcium oxide (CaO), and iron (Fe) per liter of the first nutrient solution are, for example, in the ranges shown in FIG. 13. More specifically, the nitrogen (N) content per liter of the first nutrient solution is, for example, 0.2 to 0.47 mg. The phosphorus pentoxide ($P_2O_5$) content per liter of the first nutrient solution is, for example, 0.13 to 0.33 mg. The potassium oxide ($K_2O$) content per liter of the first nutrient solution is, for example, 0.4 to 1 mg. The magnesium oxide (MgO) content per liter of the first nutrient solution is, for example, 0.12 to 0.27 mg. The calcium oxide (CaO) content per liter of the first nutrient solution is, for example, 0.33 to 0.83 mg. The iron (Fe) content per liter of the first nutrient solution is, for example, 0.003 to 0.01 mg.

In typical hydroponic growth, for example, the vegetable may be grown with a first reference nutrient solution in the second-B period P2b in the third step S3, and with a second reference nutrient solution in the second-A period P2a in the third step S3. The first reference nutrient solution and the second reference nutrient solution are liquid culture media widely used for fruit vegetables, leafy vegetables, and ornamental plants. The contents of nitrogen (N), phosphorus pentoxide ($P_2O_5$), potassium oxide ($K_2O$), magnesium oxide (MgO), calcium oxide (CaO), and iron (Fe) per liter of each of the first reference nutrient solution and the second reference nutrient solution are, for example, in the ranges shown in FIG. 13. More specifically, the nitrogen (N) content per liter of the first reference nutrient solution is, for example, about 1.3 mg. The phosphorus pentoxide ($P_2O_5$) content per liter of the first reference nutrient solution is, for example, about 0.6 mg. The potassium oxide ($K_2O$) content per liter of the first reference nutrient solution is, for example, about 2.03 mg. The magnesium oxide (MgO) content per liter of the first reference nutrient solution is, for example, about 1.15 mg. The calcium oxide (CaO) content per liter of the first reference nutrient solution is, for example, about 0.0075 mg. The iron (Fe) content per liter of the first reference nutrient solution is, for example, about 0.0135 mg. The nitrogen (N) content per liter of the second reference nutrient solution is, for example, about 0.52 mg. The phosphorus pentoxide ($P_2O_5$) content per liter of the second reference nutrient solution is, for example, about 0.24 mg. The potassium oxide ($K_2O$) content per liter of the second reference nutrient solution is, for example, about 0.81 mg. The magnesium oxide (MgO) content per liter of the second reference nutrient solution is, for example, about 0.46 mg. The calcium oxide (CaO) content per liter of the second reference nutrient solution is, for example, about 0.003 mg. The iron (Fe) content per liter of the second reference nutrient solution is, for example, about 0.0054 mg.

For example, in the first light illumination period, the vegetable is grown with the first nutrient solution that contains less nitrogen and more calcium oxide than the first and second reference nutrient solutions. This increases the sugar content and decreases the nitrate concentration in the harvested vegetable. This may occur with the mechanism below.

In the first light illumination period, the vegetable is grown with the first nutrient solution that contains less nitrogen and thus less nitrate nitrogen. This decreases, for example, the nitrate concentration in the vegetable at harvest. With less nitrogen supplied as the source of amino acids, for example, amino acids synthesized from nitrogen and carbon (C) are moderately decreased. To protect its tissue from reactive oxygen species, for example, the vegetable produces antioxidants such as ascorbic acid and polyphenols in response to illumination with the first light. Ascorbic acid and polyphenols are, for example, synthesized using sugars such as glucose and galactose. The vegetable thus accumulates, for example, antioxidants sufficient to protect its tissue and also increases sugars as precursors of antioxidants. The nutrient solution also contains, for example, a higher concentration of calcium oxide. This promotes the production of antioxidants for adaptation to strong light and increases sugars as precursors of antioxidants.

1-5-2 Second Nutrient Solution

In the first embodiment, for example, in the second step S2 and the third step S3 in hydroponic vegetable growth, the vegetable may be grown with a second nutrient solution in a period before the first light illumination period in which the vegetable is grown with the first light. The second nutrient solution is, for example, a liquid culture medium with a nitrogen content of 0.06 to 0.14 mg per liter and a calcium oxide content of 0.1 to 0.25 mg per liter. This can decrease, for example, the nitrate concentration in the vegetable at harvest and promote vegetable growth through more active photosynthesis.

The contents of nitrogen (N), phosphorus pentoxide ($P_2O_5$), potassium oxide ($K_2O$), magnesium oxide (MgO), calcium oxide (CaO), and iron (Fe) per liter of the second nutrient solution are, for example, in the ranges shown in FIG. 13. More specifically, the nitrogen (N) content per liter of the second nutrient solution is, for example, 0.06 to 0.14 mg. The phosphorus pentoxide ($P_2O_5$) content per liter of the second nutrient solution is, for example, 0.04 to 0.1 mg. The potassium oxide ($K_2O$) content per liter of the second nutrient solution is, for example, 0.12 to 0.3 mg. The magnesium oxide (MgO) content per liter of the second nutrient solution is, for example, 0.04 to 0.08 mg. The calcium oxide (CaO) content per liter of the second nutrient solution is, for example, 0.1 to 0.25 mg. The iron (Fe) content per liter of the second nutrient solution is, for example, 0.001 to 0.003 mg.

In typical hydroponic growth, for example, the vegetable may be grown with the above second reference nutrient solution in the second step S2, with the first reference nutrient solution in the second-B period P2b in the third step S3, and with the second reference nutrient solution in the second-A period P2a in the third step S3.

In contrast, in a period before the first light illumination period in the second step S2 and the third step S3, the vegetable is grown with the second nutrient solution that contains less nitrogen and more calcium oxide than the first and second reference nutrient solutions, for example. This decreases the nitrate concentration in the harvested vegetable and promotes vegetable growth through more active photosynthesis. This may occur with the mechanism below.

In a period before the first light illumination period in the second step S2 and the third step S3, the vegetable is grown with the second nutrient solution that contains less nitrogen and thus less nitrate nitrogen. This decreases, for example, the nitrate concentration in the vegetable at harvest. The nutrient solution also contains, for example, a higher concentration of calcium oxide. This promotes photosynthesis in the plants.

1-5-3 Third Nutrient Solution

In the first embodiment, for example, in the third period P3 in the fourth step S4 in hydroponic vegetable growth, the vegetable may be grown with a third nutrient solution. The third nutrient solution contains, for example, nitrogen in the form of ammonia nitrogen and has a nitrogen content of 0.21 to 0.42 mg per liter. This can decrease, for example, the nitrate concentration in the vegetable at harvest and also improve the taste of the vegetable.

The third nutrient solution may contain nitrogen (N), for example, in the form of ammonium sulfate (($NH_4)_2SO_4$) as ammonia nitrogen. The nitrogen (N) content per liter of the third nutrient solution is, for example, in the range shown in FIG. 13.

In typical hydroponic growth, for example, the vegetable may be grown with the above second reference nutrient solution in the fourth step S4.

In contrast, in the fourth step S4, the vegetable is grown with the third nutrient solution that contains less nitrogen than the second reference nutrient solution and contains nitrogen in the form of ammonia nitrogen, for example. This decreases the nitrate concentration in the harvested vegetable and improves the taste of the vegetable. This may occur with the mechanism below.

In the fourth step S4, the vegetable is grown with the third nutrient solution that contains, for example, less nitrate nitrogen. This decreases the nitrate concentration in the vegetable at harvest. The third nutrient solution also supplies, for example, ammonia nitrogen with illumination with the second light. This avoids excessive antioxidants being produced and moderately promotes synthesis of amino acids, enriching and improving the taste of the vegetable.

1-5-4 Fourth Nutrient Solution

In the first embodiment, for example, in the third period P3 in the fourth step S4 in hydroponic vegetable growth, the vegetable may be grown with a fourth nutrient solution instead of the third nutrient solution. The fourth nutrient solution has, for example, a nitrogen content of less than or equal to 0.01 mg per liter, a magnesium oxide content of 0.12 to 0.24 mg per liter, and a calcium oxide content of 0.54 to 0.8 mg per liter. This can decrease, for example, the nitrate concentration in the vegetable at harvest, improve the taste of the vegetable, and promote vegetable growth through more active photosynthesis.

The contents of nitrogen (N), phosphorus pentoxide ($P_2O_5$), potassium oxide ($K_2O$), magnesium oxide (MgO), calcium oxide (CaO), and iron (Fe) per liter of the fourth nutrient solution are, for example, in the ranges shown in FIG. 13. More specifically, the nitrogen (N) content per liter of the fourth nutrient solution is, for example, less than or equal to 0.01 mg. The phosphorus pentoxide ($P_2O_5$) content per liter of the fourth nutrient solution is, for example, 0.2 to 0.4 mg. The potassium oxide ($K_2O$) content per liter of the fourth nutrient solution is, for example, 0.72 to 1.2 mg. The magnesium oxide (MgO) content per liter of the fourth nutrient solution is, for example, 0.12 to 0.24 mg. The calcium oxide (CaO) content per liter of the fourth nutrient solution is, for example, 0.54 to 0.8 mg. The iron (Fe) content per liter of the fourth nutrient solution is, for example, 0.007 to 0.024 mg.

For example, in the fourth step S4, the vegetable is grown with the fourth nutrient solution that contains much less nitrogen, a similar amount of magnesium oxide, and much more calcium oxide as compared with the second reference nutrient solution. This decreases the nitrate concentration in the harvested vegetable, improves the taste of the vegetable, and promotes vegetable growth through more active photosynthesis. This may occur with the mechanism below.

In the fourth step S4, the vegetable is grown with the fourth nutrient solution that contains, for example, a much lower concentration of nitrogen and thus less nitrate nitrogen. This decreases the nitrate concentration in the vegetable at harvest. For example, the nutrient solution that contains a much lower concentration of nitrogen supplies less nitrogen, such as ammonia nitrogen or nitrate nitrogen, as the source of amino acids in photosynthetic metabolism. This decreases amino acids synthesized from, for example, nitrogen and carbon (C). The photosynthetic metabolism thus involves, for example, more active synthesis of organic acids as precursors of sugars than the synthesis of amino acids. The organic acids are used for reduction to promote the production of sugars. This causes, for example, sugars to increase more than amino acids through photosynthetic metabolism. The nutrient solution also contains, for example, a higher concentration of calcium oxide. This promotes vegetable growth through more active photosynthesis in the plants. For example, the nutrient solution contains magnesium oxide at a concentration that may be appropriately maintained to supply magnesium as an element of chlorophyll appropriately. This allows the reduction of carbon supplied and absorbed from carbon dioxide in the air to be maintained and promoted. This promotes, for example, the production of sugars.

In the fourth step, for example, the fourth nutrient solution may be used instead of the third nutrient solution. The fourth nutrient solution contains various nutrients other than nitrogen as compared with the third nutrient solution, thus enriching the taste of the vegetable. Either the third nutrient solution or the fourth nutrient solution may be selected as appropriate. For a rich taste of the vegetable, for example, the fourth nutrient solution may be used in the fourth step. For a light and plain taste of the vegetable, the third nutrient solution may be used in the fourth step.

1-6 Specific Examples

Lettuce was hydroponically grown with the second light for the first period (germination period) P1, the earlier part (second-A period) P2a of the second period (main growth period) P2, and the third period (before-harvesting period) P3, and with the first light for the later part (second-B period) P2b of the second period P2. The product under these conditions is referred to as a vegetable in a first example. Lettuce was grown with the second light for all of the first period P1, the second period P2 and the third period P3. The product under these conditions is referred to as a vegetable in a first reference example. The vegetable in the first example and the vegetable in the first reference example were produced under the same conditions except for the illumination conditions. More specifically, the above second nutrient solution was used for the first period P1 and the second-A period P2a. The above first nutrient solution was used for the second-B period P2b. The above third nutrient solution was used for the third period P3. Lettuce was grown under the same conditions as those for the vegetable in the first example except that the above third nutrient solution was replaced with the above fourth nutrient solution for the third period P3. The product under these conditions is referred to as a vegetable in a second example. Lettuce taken from commercially available mixed salad of field-grown vegetables was obtained as a vegetable in a second reference example. Commercially available, field-grown head lettuce was obtained as a vegetable in a third reference example.

The glutamine content was measured for each of the vegetable in the first example, the vegetable in the first reference example, the vegetable in the second reference example, and the vegetable in the third reference example. The glutamine content was measured with liquid chromatography-mass spectrometry (LC-MS). More specifically, a liquid chromatography system (LC-20AC) manufactured by Shimadzu Corporation and a mass spectrometer (compact) manufactured by Bruker were used. In liquid chromatography, UHPLC PEEK Colum InterSustain Amide (3 μm, 2.1×50 mm) was used as the column. An eluent for gradient elution was a mixture of an aqueous solution containing 0.1% of acetic acid as a liquid A and acetonitrile containing 0.1% of acetic acid as a liquid B. The percentage of the liquid B in the eluent was 99% after one minute from the start of measurement, 80% after two minutes, and 50% after 10 to 15 minutes. The eluent had a flow rate of 0.4 milliliters per minute (0.4 mL/min). The column temperature was 40 degrees Celsius (40° C.). Various components resulting from separation by liquid chromatography were ionized with electrospray ionization (ESI) for mass spectrometry. The measurement time was 0.5 to 15 minutes.

The vegetable in the first reference example had a glutamine content of 27 parts per million (ppm). The vegetable in the second reference example had a glutamine content of 38 ppm. The vegetable in the third reference example had a glutamine content of 61 ppm. In contrast, the vegetable in the first example had a glutamine content of 220 ppm. In other words, lettuce with a glutamine content of 220 ppm was obtained. The measurements show that the vegetable has a higher glutamine content when, for example, the vegetable is grown with the first light in at least the partial period in the second period P2 in the third step S3 in hydroponic vegetable growth.

The Brix value was measured for each of the vegetable in the first example, the vegetable in the second example, and the vegetable in the second reference example. The Brix value, a physical quantity used as a sugar content, was measured with a sugar refractometer.

The vegetable in the second reference example had a Brix value of 0.9. In contrast, the vegetable in the first example had a Brix value of 3 to 5.2. In other words, lettuce with a Brix value of 3 to 5.2 was obtained. The measurements show that the vegetable has a higher Brix value when, for example, the vegetable is grown with the first light in at least the partial period in the second period P2 in the third step S3 in hydroponic vegetable growth. The vegetable in the second example had a Brix value of 5 to 6.4. In other words, lettuce with a Brix value of 5 to 6.4 was obtained. The measurements show that the vegetable easily has a still higher Brix value when, for example, the vegetable is grown with the fourth nutrient solution instead of the third nutrient solution in the third period P3 in the fourth step S4 in hydroponic vegetable growth.

From another perspective, the measurements show that lettuce has a Brix value of greater than or equal to 3 when, for example, lettuce is grown with the first light in at least the partial period in the second period P2 in the third step S3 in hydroponic vegetable growth. The measurements also show that lettuce has a glutamine content of greater than or equal to 220 ppm when, for example, lettuce is grown with the first light in at least the partial period in the second period P2 in the third step S3 in hydroponic vegetable growth. The measurements thus show, for example, that the taste of the vegetable is improved.

The nitrate concentration was measured for each of the vegetable in the first example, the vegetable in the second example, and the vegetable in the second reference example. The nitrate concentration was measured with a compact nitrate ion meter (LAQUAtwin, NO3-11C/NO3-11S/NO3-11) using an ion electrode method. More specifically, a predetermined amount (0.3 milliliters (mL)) or more of sample juice was dropped, and the concentration of nitrate ions was measured.

The vegetable in the second reference example had a nitrate concentration of 1860 ppm. In contrast, the vegetable in the first example had a nitrate concentration of 760 to 1300 ppm. The measurements show that the vegetable has a lower concentration of nitrate when, for example, the vegetable is hydroponically grown with the first nutrient solution and the second nutrient solution containing less nitrogen (N) per liter than the first reference nutrient solution and the second reference nutrient solution used for typical hydroponic vegetable growth. From another perspective, for example, the measurements show that lettuce hydroponically grown with the first nutrient solution and the second nutrient solution has a nitrate concentration of less than or equal to 1300 ppm. The measurements thus show, for example, that a healthier vegetable can be produced. The vegetable in the second example had a nitrate concentration of 180 to 1100 ppm. The measurements show that the vegetable easily has a lower concentration of nitrate when, for example, the vegetable is hydroponically grown with the fourth nutrient solution containing less nitrogen (N) per liter than the third nutrient solution in the third period P3 in the fourth step S4. From another perspective, for example, the measurements show that lettuce hydroponically grown with the fourth nutrient solution has a nitrate concentration of less than or equal to 1100 ppm.

1-7 Overview of First Embodiment

With the hydroponic method for vegetable production according to the first embodiment, for example, in the third step S3 in the period of hydroponic vegetable growth, the vegetable is grown with the first light in at least the partial period in the second period P2. The first light has the maximum value of the light intensity (first maximum value) in the visible light wavelength range of less than or equal to 500 nm. This increases, for example, the glutamine and sugar contents in the vegetable. This improves, for example, the taste of the vegetable.

2 OTHER EMBODIMENTS

The present disclosure is not limited to the above first embodiment and may be changed or modified variously without departing from the spirit and scope of the present disclosure.

The invention claimed is:

1. A vegetable production method, comprising:
seeding;
causing a cotyledon to sprout from a seed in a first period;
growing a vegetable in a second period subsequent to the first period;
further growing the vegetable in a third period subsequent to the second period; and
harvesting the vegetable,
wherein the vegetable is grown with first light in a later part of the second period, and is grown with second light in the first period, an earlier part of the second period, and the third period, the first light having a first maximum value of a light intensity in a wavelength range of 420 to 490 nm and including at least portion of light in a wavelength range of 500 to 600 nm, the second light having a second maximum value of a light intensity in a wavelength range of 590 to 650 nm, having a peak light intensity less than the second maximum value in a visible light wavelength range of less than or equal to 500 nm, and including light in a wavelength range of 500 to 590 nm.

2. The vegetable production method according to claim 1, wherein
in the growing the vegetable in the second period, the later part of the second period has a length of ¼ to ½ of a total length of the first period, the second period, and the third period.

3. The vegetable production method according to claim 1, wherein
the second light has a maximum light intensity being a maximum value of a relative light intensity in a wavelength range of 590 to 650 nm, a first value of a relative light intensity at a wavelength of 700 nm being greater than or equal to 20 percent of the maximum light intensity, and a second value of a relative light intensity at a wavelength of 800 nm being less than or equal to 10 percent of the maximum light intensity.

4. The vegetable production method according to claim 3, wherein
the vegetable includes a leafy vegetable.

5. The vegetable production method according to claim 2, wherein
the second light has a maximum light intensity being a maximum value of a relative light intensity in a wavelength range of 590 to 650 nm, a first value of a relative light intensity at a wavelength of 700 nm being greater than or equal to 20 percent of the maximum light intensity, and a second value of a relative light intensity at a wavelength of 800 nm being less than or equal to 10 percent of the maximum light intensity.

6. The vegetable production method according to claim 5, wherein
the vegetable includes a leafy vegetable.

7. The vegetable production method according to claim 2, wherein
the vegetable includes a leafy vegetable.

8. The vegetable production method according to claim 1, wherein
the vegetable includes a leafy vegetable.

* * * * *